(12) United States Patent
Leban

(10) Patent No.: US 6,740,444 B2
(45) Date of Patent: May 25, 2004

(54) PEM FUEL CELL WITH ALTERNATING RIBBED ANODES AND CATHODES

(75) Inventor: Marzio Leban, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 10/002,730

(22) Filed: Oct. 29, 2001

(65) Prior Publication Data

US 2003/0082425 A1 May 1, 2003

(51) Int. Cl.$^7$ .................................................. H01M 4/86
(52) U.S. Cl. .............................. 429/41; 429/40; 429/32; 429/38
(58) Field of Search ................................ 429/40–41, 32, 429/38

(56) References Cited

U.S. PATENT DOCUMENTS

| | | | |
|---|---|---|---|
| 4,169,917 A | * 10/1979 | Baker et al. | 429/26 |
| 4,877,506 A | * 10/1989 | Fee et al. | 204/242 |
| 5,322,744 A | 6/1994 | Koeseki | |
| 6,066,409 A | 5/2000 | Ronne et al. | |
| 6,127,055 A | 10/2000 | Simmons, Jr. | |
| 6,150,049 A | 11/2000 | Nelson et al. | |
| 6,200,696 B1 | 3/2001 | Farooque et al. | |
| 6,232,008 B1 | 5/2001 | Wozniczka et al. | |
| 6,245,454 B1 | 6/2001 | Gocho et al. | |
| 6,361,893 B1 | * 3/2002 | George et al. | 429/31 |
| 6,593,022 B1 | * 7/2003 | McLean | 429/38 |
| 6,677,070 B2 | * 1/2004 | Kearl | 429/33 |

OTHER PUBLICATIONS

Journal of Power Sources 61 article dated 1996 by Dicks entitled "Hydrogen Generation from Natural Gas for the Fuel Cell Systems of Tomorrow".

* cited by examiner

*Primary Examiner*—Mark Ruthkosky

(57) ABSTRACT

The invention disclosed herein is directed toward a novel structural design for a PEM fuel cell, as well as a novel method of creating an anode and a cathode via a sputtering technique. This invention can be used with hydrogen or direct methanol fuel cells. The geometry, discussed more fully above, allows a design engineer to construct a compact fuel cell useful in portable devices requiring battery power. In addition to facilitating connecting multiple fuel cells together in a layer, the design of this invention allows for the creation of fuel cell stacks. The sputtering disclosed herein is comprised of sputtering thin film catalysts onto ribbed surfaces, thereby creating anodes and cathodes. In order for a high effective surface area for the fuel and oxidant and their respective reactions to be created, a porous catalyst could be used. In addition, the thickness of the catalysts can be chosen in such a way as to support electron conduction and, therefore, to allow the catalyst and the surface upon which it was sputtered to act as an anode and a cathode.

33 Claims, 3 Drawing Sheets

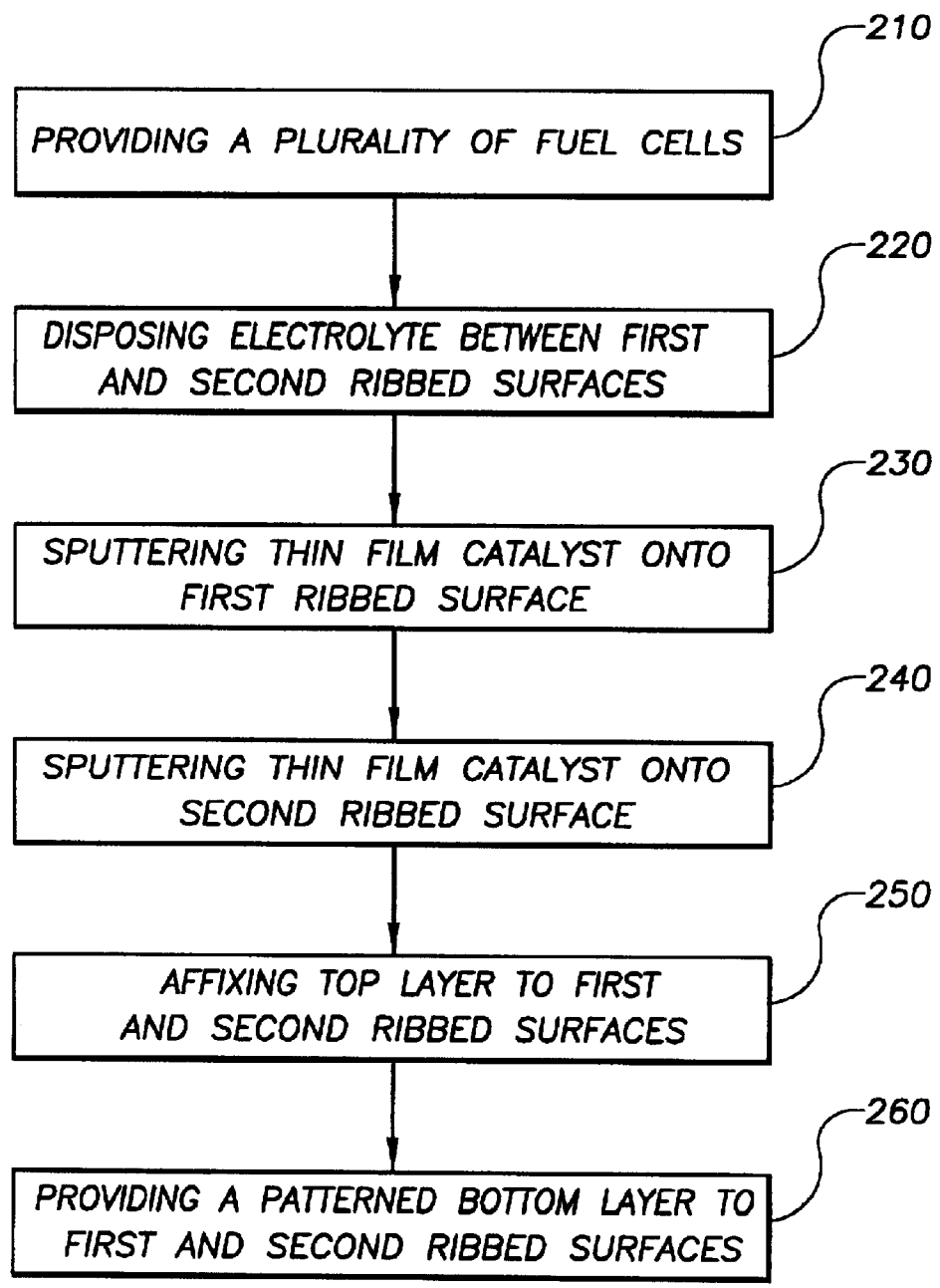

PEM FUEL CELL WITH ALTERNATING RIBBED ANODES AND CATHODES

FIELD OF THE INVENTION

The present invention relates to electrochemical fuel cells and a method of assembling the same. More specifically, the present invention relates to polymer electrolyte membrane fuel cells ("PEM") built on a ribbed substrate with alternating anode and cathode regions.

BACKGROUND OF THE INVENTION

Electrochemical fuel cells convert fuel and an oxidant to electricity and reaction products. A typical fuel cell consists of a cathode, an anode, and an electrolyte. The electrolyte is sandwiched between the cathode and anode. Fuel, in the form of hydrogen for example, is supplied to the anode where a catalyst, typically platinum, catalyzes the following reaction:

Anode reaction: $H_2 \rightarrow 2H^+ + 2e^-$  Equation (1)

The catalyst helps separate the stable hydrogen fuel into hydrogen ions and two electrons. At the cathode, an oxidant, in the form of oxygen or oxygen containing air, is supplied to the cathode. In order for electricity to be produced, the hydrogen ions and the two electrons must make their way to the cathode. This can be accomplished in the following way. Once the reaction at the anode occurs, the two hydrogen ions act as cations and accordingly migrate through the electrolyte membrane to the cathode. Movement of the two electrons can be facilitated with an external circuit connecting the anode to the cathode, resulting in the production of electricity.

The air that was supplied to the cathode reacts with the hydrogen ions that have crossed the membrane and with the electrons from the external circuit to form liquid water as the reaction product. This reaction, shown by Equation 2, is typically catalyzed by platinum.

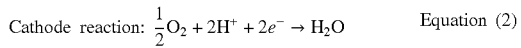

Cathode reaction: $\frac{1}{2}O_2 + 2H^+ + 2e^- \rightarrow H_2O$  Equation (2)

As can be seen from the foregoing description, the exemplary hydrogen fuel cell can produce electricity and a reaction product, namely water.

In the prior art, fuel cells have been categorized into five types according to the nature of the electrolyte employed in the cell, namely, alkaline, phosphoric acid, molten carbonate, solid oxide and polymer electrolyte. The present invention pertains to polymer electrolyte fuel cells, also known as the proton-exchange-membrane ("PEM") cells. In a PEM cell, the electrolyte is comprised of a thin membrane made of polymer similar to polytetrafluoroethylene (PTFE or Teflon®) with sulfonic acid groups included in the polymer molecular structure. The sulfonic acid groups are acid ions, which act as an active electrolyte.

In order for an electrolyte membrane to efficiently perform in a fuel cell, it should allow the flow of ions through the membrane to the cathode, while simultaneously prohibiting the stable fuel molecules from migrating to the cathode. The polymers used in PEM cells have the dual attributes of readily conducting hydrogen nuclei ($H^+$ ions or protons) from the anode to the cathode, while effectively blocking the flow of diatomic hydrogen to the cathode. The PEM cell operates in the same manner as was described above with reference to the exemplary hydrogen fuel cell, i.e., hydrogen protons flow through the electrolyte membrane and electrons are passed through an external electrical conductor.

Some of the operational criteria of the different components of a fuel cell are as follows. Hydrogen gas or methanol fuel must be distributed uniformly over the active area of the anode side of the electrolyte membrane. Similarly, oxygen or air must be distributed uniformly over the cathode side of the electrolyte membrane. The electrolyte membrane must be kept moist. A catalyst must be uniformly dispersed over the active area on both sides of the electrolyte membrane in such a manner that each catalyst-particle site is concurrently accessible to the reactant gas, the polymer electrolyte material, and to a third material which forms an electrically conductive path. A means must be provided to collect the electron flow, which is the electrical current, over the entire area of the membrane, and to ensure an uninterrupted electrically conductive flow path from the catalyzed surfaces of the membrane to these current-collector devices. Finally, the channels or chambers containing the reactant gas must be sealed and isolated from one another and from the ambient atmosphere in order to prevent both wasteful loss of the gases and, more importantly, potentially dangerous mixing of the reactants inside the cell.

Assuming that these conditions can be met, fuel cells can be used in a variety of applications. One well known use for fuel cells is to use them as an alternative power source for automobiles or buses. Because a single fuel cell is only capable of producing a voltage in the range of 0.4 to 0.8 volts, many applications require multiple cells to be assembled in series electrically, enabling higher voltages. One problem with using fuel cells in these stacks is that adding additional fuel cells necessarily increases the battery's overall size. Conventional PEM fuel cell stacks are built with bipolar carbon plates between the cells. Naturally, these plates contribute to the overall size of the fuel cell design. When a fuel cell is used as a stationary power source, the size of the cell may not be an issue. For portable devices, however, the size and weight of the fuel cell is of paramount importance. There is thus a need for compact fuel cells that can meet the power requirements of portable devices such as cellular telephones, laptop computers, breathalyzer devices, personal digital assistants, and the like.

SUMMARY OF THE INVENTION

The invention disclosed herein is directed toward a novel structural design for a PEM fuel cell, as well as a novel method of creating an anode and a cathode via a sputtering technique. This invention can be used with hydrogen or direct methanol fuel cells. The geometry, discussed more fully below, allows a design engineer to construct a compact fuel cell useful in portable devices requiring battery power. In addition to facilitating connecting multiple fuel cells together in a layer, the design of this invention allows for the creation of fuel cell stacks. The sputtering disclosed herein is comprised of sputtering thin film catalysts onto ribbed surfaces, thereby creating anodes and cathodes. In order for a high effective surface area for the fuel and oxidant and their respective reactions to be created, a porous catalyst could be used. In addition, the thickness of the catalysts can be chosen in such a way as to support electron conduction and, therefore, to allow the catalyst and the surface upon which it was sputtered to act as an anode and a cathode.

BRIEF DESCRIPTION OF THE DRAWING

The invention is described with reference to the several figures of the drawing, in which.

FIG. 3 is a flow chart depicting the steps of an embodiment for a method of preparing a fuel cell of the present invention.

DETAILED DESCRIPTION

The present invention is directed toward a compact PEM fuel cell and a method of assembling that cell. A typical fuel cell is comprised of an anode, a cathode, and an electrolyte therebetween. As was discussed above, fuel cells convert fuel and an oxidant to electricity and reaction products. This is known in the art as "fuel processing." Considerable research has been carried out in the area of fuel processing. For a review of some of the key technologies see Dicks, A. L., "Hydrogen generation from natural gas for the fuel cell system of tomorrow," *Journal of Power Sources* vol. 61, pp. 113–24 (1996). See also U.S. Pat. No. 6,200,696 entitled "Internal Reforming Fuel Cell Assembly with Simplified Fuel Feed" and U.S. Pat. No. 6,150,049 "Fluid Flow Plate for Distribution of Hydration Fluid in a Fuel Cell."

The embodiments of this invention use either hydrogen or methanol as the fuel and can be used with the technologies disclosed in Dicks and similar well known methods. Similarly, the reaction products resulting from the conversion of fuel and an oxidant to electricity must be removed from the fuel cell. There are, likewise, many prior art techniques for accomplishing these tasks. See e.g., U.S. Pat. No. 6,245,454 entitled "Fuel Cell and Method of Installing Linings on Gas Manifolds of Fuel Cell," U.S. Pat. No. 6,232,008 entitled "Electrochemical Fuel Cell Stack with Improved Reactant Manifolding and Sealing" and U.S. Pat. No. 6,066,409 entitled "Electrochemical Fuel Cell Stack with Improved Reactant Manifolding and Sealing." The embodiments disclosed herein are compatible with the use of these or similar techniques.

Figure 1:
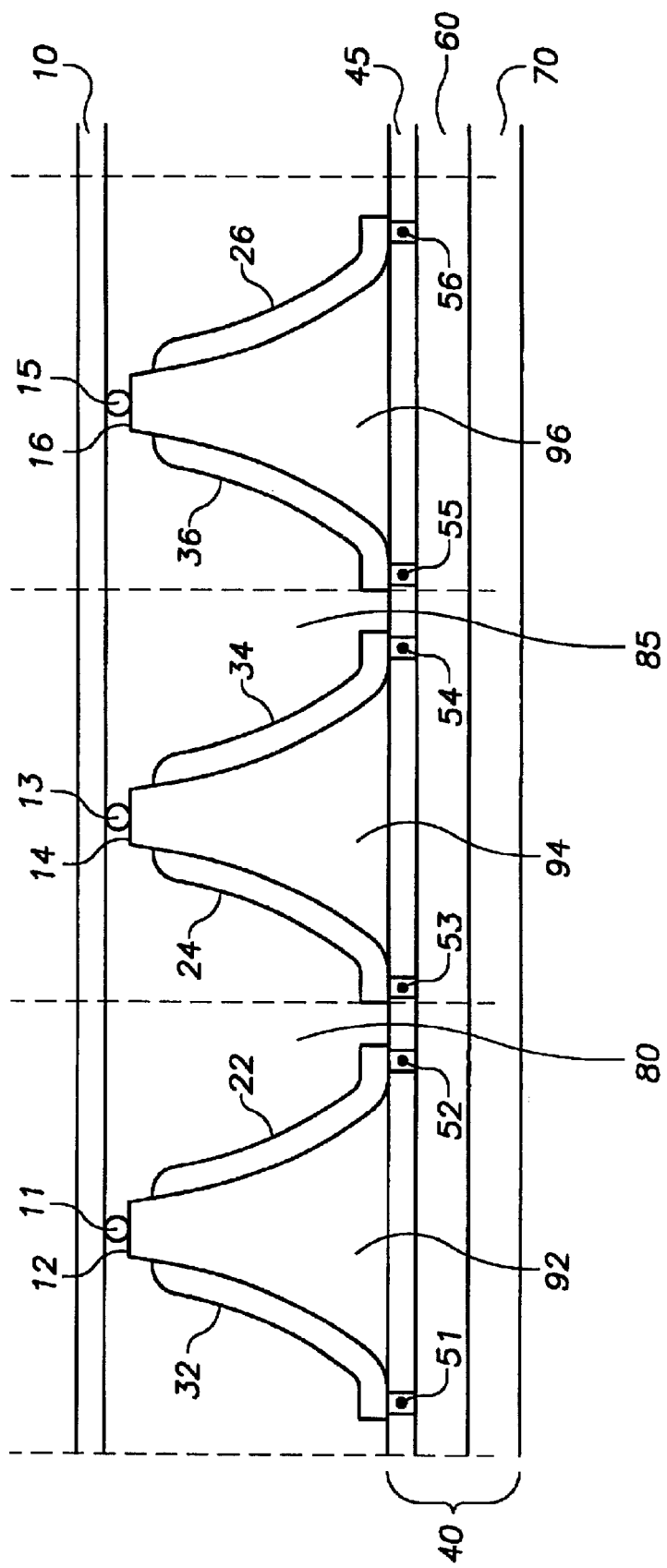
FIG. 1 is a cross-sectional view of an embodiment of a fuel cell of the present invention.

FIG. 1 shows an embodiment of the fuel cell of the present invention. The embodiment depicted in FIG. 1 is comprised of three cells stacked together along a horizontal plane. As was discussed above, the power needs of a particular application often require the use of multiple fuel cells. As such, design engineers often connect individual cells in series or in parallel, or some combination thereof, in order to meet the power demands of the particular application. The choice of the number of fuel cells that can be stacked together according to this invention is flexible and can be tailored to the specific power needs of the device being powered by the fuel cell. Thus, additional embodiments could be comprised of more cells configured in a way similar to that depicted in FIG. 1. An additional embodiment, discussed more fully below with reference to FIG. 2, discloses a design wherein the fuel cells are stacked in both the horizontal and vertical planes.

The fuel cell of the embodiment shown in FIG. 1 comprises, among other things, an enclosing layer 10 and a first 92, second 94, and third 96 electrolyte disposed between a ribbed substrate. Going from left to right in FIG. 1, a first ribbed surface comprises a first cathode 32, a second ribbed surface comprises a first anode 22, a third ribbed surface comprises a second anode 24, a fourth ribbed surface comprises a second cathode 34, a fifth ribbed surface comprises a third cathode 36, and a sixth ribbed surface comprises a third anode 26. The embodiment of FIG. 1 also comprises a connecting layer 40, which provides electrical connectivity between the various anodes and cathodes. Intake and exhaust means can be added in additional embodiments, as discussed above, in order to facilitate fuel processing. The connecting layer 40 in one embodiment could be comprised of a dielectric layer 45; connection points 51, 52, 53, 54, 55, and 56; a metal conductor 60; and a substrate 70.

In the embodiment of FIG. 1, the enclosing layer 10 is used for sealing purposes and to impart structural integrity to the fuel cell. In terms of its sealing function, it is important to isolate the hydrogen and oxygen gases that are contained in the chambers between the anodes and cathodes. The first of these chambers 80 is filled with $H_2$, which is used to facilitate the reaction described above by Equation 1. The second chamber 85 is filled with $O_2$ and is used in the reaction described by Equation 2. The enclosing layer 10 can be sufficiently long to provide additional sealed chambers within which the hydrogen and oxygen used to facilitate the chemical reactions transpiring at the anodes and cathodes can be housed.

In order to ensure that the enclosing layer 10 is securely fastened and airtight enough to enable the containment of the hydrogen and oxygen in the first 80 and second chambers 85, or other reactants in alternate embodiments, an adhesive 11, 13, and 15 can be used to secure the enclosing layer 10 to the top of the first 12, second 14, and third electrode assemblies 16. While FIG. 1 depicts the enclosing layer attached to the top of the fuel cell, alternative embodiments could be comprised of an enclosing layer located on the bottom or side of the fuel cells. Some examples of adhesives 11, 13, and 15 that may be used in the embodiments of this invention are epoxy or thermally cured adhesives. In an additional embodiment employing more than three fuel cells, adhesive can be applied to the tops or other sides of these additional electrode assemblies to create additional sealed chambers within which to house hydrogen, oxygen, and the like.

As was previously mentioned, the basic building blocks of a fuel cell are an anode, a cathode, and an electrolyte. The embodiment of FIG. 1 contains a plurality of anodes 22, 24, and 26, a plurality of cathodes 32, 34, and 36 and an electrolyte located therebetween. The three electrolytes in this embodiment are depicted in FIG. 1 as reference numerals 92, 94, and 96. The plurality of anodes 22, 24, and 26 and cathodes 32, 34, and 36, in one embodiment, could be coated with a proton conducting material and a catalyst. The proton conducting material could be a sulphonated fluoropolymer such as fluoroethylene or Nafion® from DuPont, for example. In addition, the proton conducting material could be contained within a porous dielectric media, 92, 94, and 96 such that proton conduction is maintained but electron conduction is denied.

Thin film catalysts could be sputtered on the ribbed surfaces of the electrode assemblies 12, 14, and 16, thereby creating anodes and cathodes with a porous catalyst. A porous catalyst has the advantage of presenting a high effective surface area to the fuel and oxidant for their respective reactions. The catalyst thin films could be of such a thickness that they also support electron conduction and therefore are by themselves the anode and cathode. Alternatively, a catalyst could be deposited on the porous material to support electron conduction and function as anode and cathode. The catalyst could be platinum or other similar state-of-the-art catalyst. In addition to using a sputtering technique to apply the catalyst or additional porous material of either of these embodiments, the catalyst and porous material could be deposited by using shadow masking, over pre-patterned photoresist using a lift-off process, or by depositing on patterning in alternate embodiments.

As can be seen from FIG. 1, the first cathode 32 and the third anode 26 provide a means for sealing each end of the fuel cell of this embodiment. In an additional embodiment, side layers, similar to the enclosing layer 10 could be used to seal the outer most chambers of the inventive fuel cell. As was the case with the enclosing layer 10, an adhesive could be used to secure these side layers to a suitable location.

In an alternate embodiment wherein the fuel cell is a direct methanol fuel cell, the anode catalyst could be Platinum Ruthenium or Platinum Ruthenium Osmium or Platinum Ruthenium Osmium Iridium. As is well known in the art, rather than using pure hydrogen for the fuel, methanol could be used. In this embodiment, the $H_2$ stored in chamber 80 could be replace by a methanol-water fuel. Similarly, the means for supplying fuel and removing reaction product could be altered to allow the flow of methanol to this embodiment and the removal of carbon dioxide from the anode and water from the cathode.

As can be seen from FIG. 1, the cross-section of the anodes 22, 24, and 26 and cathodes 32, 34, and 36 of this embodiment are substantially trapezoidal in shape. This shape is advantageous for the sputtering process. Different catalysts and/or electrodes can be sputtered on either side of the trapezoid by tilting the substrate containing the trapezoids. The process of tilting the substrate allows the trapezoids to mask each other such that only one side receives the deposited material. Tilting the trapezoid in the opposite direction allows the opposite side to receive the deposited material. In addition, the trapezoidal configuration doubles the effective surface area as compared to prior art geometries. This increase in surface area, in turn, increases the amount of catalyst that can be sputtered onto the ribbed surfaces. Increasing the amount of available catalyst allows for an increase in reaction rates occurring at the anodes 22, 24, and 26 and cathodes 32, 34, and 36 of this embodiment. These advantages could be realized in alternative embodiments as well, wherein the cross-section of the anodes and cathodes could be substantially rectangular, square, curved, or of any other suitable shape.

In order for the connecting layer 40 to provide electrical connectivity between the anodes 22, 24, and 26 and cathodes 32, 34, and 36 of the various embodiments, the connecting layer 40 could be comprised of a metal layer 60 coated with a dielectric layer 45. The connecting layer 40 could also contain electrical pathways beginning at connection points 51, 52, 53, 54, 55, and 56 and connecting the anodes 22, 24, and 26 and cathodes 32, 34, and 36 to the metal layer 60, and a substrate 70. If additional anodes or cathodes are added in alternate embodiments, corresponding additional connection points and pathways within the metal layer 60 could likewise be added. As can be seen in FIG. 1 the connection points 51, 52, 53, 54, 55, and 56 traverse the dielectric layer 45. The dielectric layer 45 insulates the anodes 22, 24, and 26 and cathodes 32, 34, and 36 from the metal conductor 60. The dielectric 45 could be a plastic material, e.g., polyimide. Additionally, the dielectric layer 45 could be a material, such as silicon nitride, silicon dioxide, or aluminum oxide for example.

The metal conductor 60 could be comprised of any suitable conducting metal. Some examples are aluminum, silver, platinum, and gold. The metal conductor 60 can be patterned with the appropriate structure such that the first 22, second 24, and third 26 anodes are connected together. In addition, the metal conductor 60 could be patterned in a way that would connect the first 32, second 34, and third 36 cathodes together. These connections could be patterned either in series, in parallel, or a combination thereof. A design engineer is thus free to tailor the available current and voltage of the various embodiments of this invention to the specific power requirements of the device used in conjunction with the fuel cell. In additional embodiments containing more fuel cells or stacks, the addition of more anodes and cathodes provides a design engineer with more freedom in terms of patterning the connections among the various anodes and cathodes in series, parallel, or a combination of both. This freedom, in turn, allows wide latitude in meeting power constraints. The last component of the connecting layer 40 in this embodiment is a substrate 70, which could be comprised of silicon wafer, ceramic, plastic, or the like.

Figure 2:
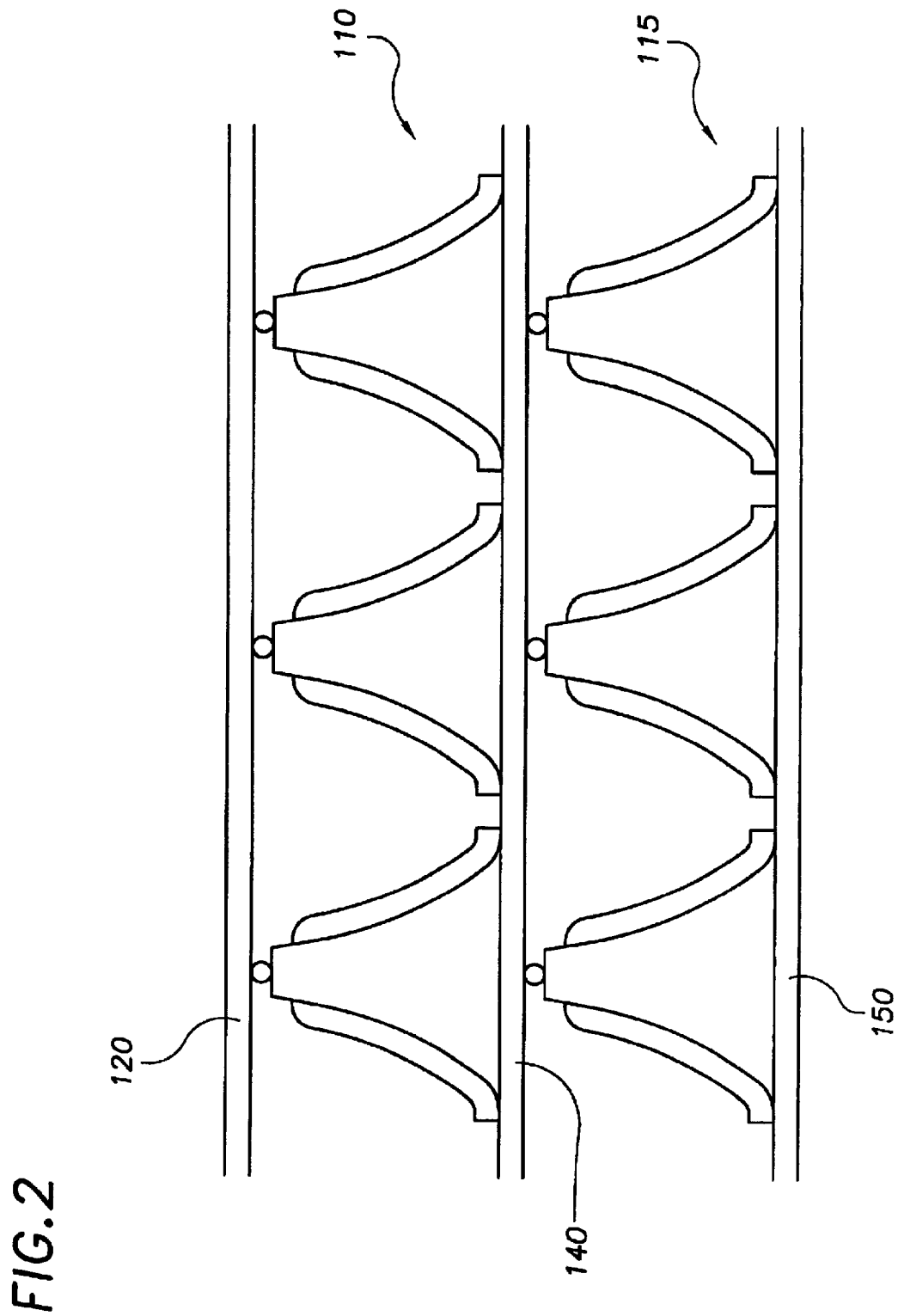
FIG. 2 is a cross-sectional view of a plurality of fuel cells according to an embodiment of the present invention.

An additional embodiment, which allows a design engineer to vertically stack the fuel cells of the present invention, is depicted in FIG. 2. In this embodiment, six fuel cell electrode assemblies are depicted, three of which comprise a lower layer fuel cell 115 and three of which comprise an upper layer fuel cell 110. The lower layer fuel cell 115 and the upper layer fuel cell 110 depicted in FIG. 2 contain equal numbers of fuel cells. In alternate embodiments, the upper 110 and lower 115 fuel cell layers need not contain the same number of fuel cells. As was the case with the earlier described embodiments, this embodiment could also include fuel intake and exhaust removal means for the upper 110 and lower 115 fuel cell layers.

The six fuel cells and chambers therebetween of this embodiment are substantially similar to those described above with reference to FIG. 1. Although the interior components of the fuel cell are similar, the outer layers of this embodiment are somewhat different because it may be desirable to provide electrical connectivity between the two horizontal stacks of fuel cells 110 and 115. The fuel cells of FIG. 2 can comprise an enclosing layer 120 similar to that described above with reference to FIG. 1. The enclosing layer 120 of this embodiment could be affixed to the electrode assemblies contained within the upper layer fuel cell 110 with an adhesive. In additional embodiments containing more than three electrodes in the upper layer fuel cell 110, the enclosing layer 120 can be lengthened to accommodate these additional electrodes and to provide an enclosure to house hydrogen, oxygen, methanol/water, and the like.

The three remaining layers depicted in FIG. 2 are similar to the connecting layer 40 described above in an alternate embodiment. More particularly, a first 140 and a second connecting layer 150 could be comprised of a dielectric layer, connection points, a metal conductor, and a substrate. In this embodiment, these components can be used as they were used above with reference to FIG. 1 in order to provide electrical connectivity between the anodes and cathodes of this embodiment. These electrical connections can be made in parallel, in series, or a combination thereof. The first connecting layer 140 can be used to provide electrical connectivity between the anodes and cathodes contained in the upper layer fuel cell 110. Similarly, the second connecting layer 150 can be used to electrically connect the anodes and cathodes contained in the lower layer fuel cell 115. In one embodiment, a side layer, similar to the first 140 or second 150 connecting layer can be used to provide electrical connectivity between the upper 110 and lower 115 fuel cell layers. If a side layer is used, it has the additional advantage of providing structural integrity to the overall design. In alternate embodiment, an electrode assembly could be used to provide electrical connectivity or structural integrity to the upper 110 and lower 115 fuel cell layers.

Additional layers of fuel cells can be added in alternate embodiments. Each additional layer could utilize connecting layers, as described above, to provide electrical connectivity to the various anodes and cathodes therein.

In an additional embodiment of the present invention, a method of preparing a PEM fuel cell assembly is disclosed. With reference to FIG. 3, the method is comprised of providing 210 a plurality of fuel cells, wherein each fuel cell comprises ribbed surfaces used to make porous anodes and porous cathodes. A next step in the method of this embodiment can be disposing 220 an electrolyte between first and second ribbed surfaces. In addition, the method includes sputtering 230 a thin film catalyst onto a first ribbed surface followed by sputtering 240 a thin film catalyst onto a second ribbed surface. The method further comprises the step of affixing 250 a top layer to a top edge of the first and second ribbed surfaces thereby enclosing the chamber and providing 260 a patterned bottom layer for the first and second ribbed surfaces.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A PEM fuel cell comprising:
   a plurality of fuel cells, each fuel cell comprising:
      first and second ribbed surfaces;
      an electrolyte disposed between the first and second ribbed surfaces;
      the first ribbed surface comprising an anode;
      the second ribbed surface comprising a cathode; and
      an enclosing layer affixed to a first edge of a plurality of first and second ribbed surfaces, thereby creating a chamber between the surfaces of alternating anodes and cathodes; and
   a connecting layer affixed to a second edge of the first and second ribbed surfaces, providing electrical connectivity between select anodes and cathodes.

2. The PEM fuel cell of claim 1 wherein the anode comprises a porous thin film catalyst sputtered onto the first ribbed surface and the cathode comprises a porous thin film catalyst sputtered onto the second ribbed surface.

3. The PEM fuel cell of claim 2, further comprising the porous thin film catalyst deposited on a porous material.

4. The PEM fuel cell of claim 1, wherein the plurality of fuel cells are located in a layer.

5. The PEM fuel cell of claim 4, wherein the plurality of fuel cells are substantially trapezoidally shaped.

6. The PEM fuel cell of claim 4, wherein the electrolyte comprises a proton conducting material.

7. The PEM fuel cell of claim 6, wherein the proton conducting material is selected from the group consisting of plastic and teflon.

8. The PEM fuel cell of claim 4, wherein the connecting layer comprises a substrate beneath a patterned metal layer containing pathways through which electricity flows, the metal layer being covered with a dielectric material.

9. The PEM fuel cell of claim 8, wherein the substrate is selected from the group consisting of silicon wafer, ceramic, and plastic.

10. The PEM fuel cell of claim 8, wherein the dielectric is polyimide.

11. The PEM fuel cell of claim 4, wherein a first chamber contains a fuel selected from the group consisting of hydrogen and methanol-water and a second chamber contains oxygen.

12. The PEM fuel cell of claim 1, wherein the plurality of fuel cells are located in a plurality of stacked layers.

13. The PEM fuel cell of claim 12, further comprising a side layer for providing electrical connectivity between the stacked layers.

14. The PEM fuel cell of claim 12, wherein the plurality of fuel cells are substantially trapezoidally shaped.

15. The PEM fuel cell of claim 12, wherein the electrolyte comprises a proton conducting material.

16. The PEM fuel cell of claim 15, wherein the proton conducting material is selected from the group consisting of plastic and teflon.

17. The PEM fuel cell of claim 12, wherein the connecting layer comprises a substrate beneath a patterned metal layer containing pathways through which electricity flows, the metal layer being covered with a dielectric material.

18. The PEM fuel cell of claim 17, wherein the substrate is selected from the group consisting of silicon wafer, ceramic, and plastic.

19. The PEM fuel cell of claim 17, wherein the dielectric is polyimide.

20. The PEM fuel cell of claim 12, wherein the side layer comprises a substrate beneath a patterned metal layer containing pathways through which electricity flows, the metal layer being covered with a dielectric material.

21. The PEM fuel cell of claim 20, wherein the substrate is selected from the group consisting of silicon wafer, ceramic, and plastic.

22. The PEM fuel cell of claim 20, wherein the dielectric is polyimide.

23. The PEM fuel cell of claim 12, wherein a first chamber contains a fuel selected from the group consisting of hydrogen and methanol-water and a second chamber contains oxygen.

24. An electronic device using the fuel cell of claim 4 as a power source.

25. A method of preparing a PEM fuel cell assembly, comprising the steps of:
   providing a plurality of fuel cells, each fuel cell comprising a first and second ribbed surface;
   disposing an electrolyte between the first and second ribbed surfaces;
   sputtering a thin film catalyst onto the first ribbed surface to create an electrode selected from the group consisting of an anode and a cathode;
   sputtering a thin film catalyst onto the second ribbed surface to create an electrode selected from the group consisting of an anode and a cathode;
   affixing a top layer to a top edge of the first and second ribbed surfaces, thereby defining a chamber between consecutive ribbed surfaces; and,
   providing a patterned bottom layer to a bottom edge of the ribbed surface thereby providing electrical connectivity between select anodes and cathodes.

26. The method of claim 25, further comprising the step of layering the plurality of fuel cells.

27. The method of claim 26, further comprising the step of stacking the plurality of fuel cells.

28. A PEM fuel cell comprising a plurality of fuel cells, each fuel cell comprising
   means for providing:
      first and second ribbed surfaces;

an electrolyte disposed between the first and second ribbed surfaces;

the first ribbed surface comprising an anode;

the second ribbed surface comprising a cathode; and enclosing layer means affixed to a first edge of a plurality of first and second ribbed surfaces, thereby creating means for a chamber between the surfaces of alternating anodes and cathodes; and, connecting layer means affixed to a second edge of the first and second ribbed surfaces, thereby providing means for electrical connectivity between select anodes and cathodes.

29. The PEM fuel cell of claim 28 wherein a first porous thin film catalyst means is sputtered onto the first ribbed surface and a second porous thin film catalyst means is sputtered onto the second ribbed surface.

30. The PEM fuel cell of claim 28, wherein the plurality of fuel cells are located in a layer.

31. The PEM fuel cell of claim 30, wherein the plurality of fuel cells are substantially trapezoidally shaped.

32. The PEM fuel cell of claim 30, wherein the electrolyte comprises a proton conducting material.

33. The PEM fuel cell of claim 28, wherein the plurality of fuel cells are located in a plurality of stacked layers.

* * * * *